Dec. 6, 1966   O. WEBER   3,289,845

FILTER PRESSES

Filed May 27, 1963

*Oscar Weber*

INVENTOR

BY *Wenderoth, Lind, and Ponack*

ATTORNEYS

United States Patent Office 3,289,845
Patented Dec. 6, 1966

3,289,845
FILTER PRESSES
Oscar Weber, Reinach, Switzerland, assignor to Ciba Limited, Basel, Switzerland, a Swiss company
Filed May 27, 1963, Ser. No. 283,316
Claims priority, application Switzerland, May 28, 1962, 6,458/62
1 Claim. (Cl. 210—231)

The present invention relates to filter presses from which solid matter having a very low moisture content is obtained by pressing the filter cake.

Filter presses usually consist of several identical filter chambers, into which is fed the suspension that is to be filtered. The filtrate leaves the chambers through the filter medium, and the solids are retained by the latter in the chambers and form a layer of increasing thickness on the surface of the filter medium. When the chambers are almost filled with solid matter, feeding of the suspension to the chambers is stopped. The solid matter remaining in one of the chambers is called the filter cake. The filter cakes are usually washed by flushing the filter chambers with a washing liquid. The filter cakes thus obtained, either with or without washing, still have a high moisture content and are usually dried out afterwards. A frequently used method for drying out the filter cakes comprises blowing compressed air or other pressurized gas through the filter chambers. The gas fed into the chamber under pressure passes through the filter cake, taking the greater part of the moisture with it, and leaves the chamber through the filter medium. A disadvantage of this blowing process is that, because of cracks in the filter cake, the gas does not pass uniformly through the filter cake. In addition, the expenditure of a relatively large amount of energy is necessary, since fresh pressurised gas must be fed in continually. A gas which is inert with respect to the solid matter must also be chosen. When blowing a gas through solid matter which contains combustible or poisonous solvents, the operation becomes considerably more complicated.

A second method for drying out filter cakes produced in filter presses comprises mechanical squeezing, for example, by means of a piston or flexible membrane. The above-mentioned disadvantages do not arise with such a squeezing process.

The choice of drying method in order to obtain the best results depends largely on the structure of the filter cake. For example, incompressible or only slightly compressible filter cakes are more suited to drying by the blowing method than by the squeezing method. However, drier filter cakes are generally obtained by the squeezing method, since a more uniform pressure can be exerted on the filter cake. At the same time, by means of the mechanical breakdown of the structure, moisture retained within the structure can also be removed in most cases, a result which cannot be achieved, or can only be achieved to a much smaller extent, by the blowing method.

The present invention provides a filter press, in which the filter cake, after the filtering and washing process, may be squeezed mechanically in a simple manner. The filter press comprises one or more filter chambers, and each chamber is bordered on at least one side by a movable wall, which has the filter medium on the chamber side, and there is provided means for applying a pressure to the side facing away from the filter chamber.

The movable walls may be constructed of a flexible or a non-flexible material. A wall constructed of a non-flexible material may be rendered movable by being fitted loosely in the chamber, or by being provided with a flexible intermediate member along its edges. A filter chamber may be provided with two movable walls and in operation both walls may be simultaneously pressed against the filter cake. However, such an arrangement may be operated so that only one wall has pressure exerted on it, whilst the other is exhausted at the same time. If during the squeezing process pressure is applied to first one and then the other wall alternately, several times, the mechanical stress on the filter cake is increased considerably, thus producing a favourable effect on its moisture content. A similar type of stress on the filter cake may also be achieved by exerting pressure intermittently on both movable walls. Filter chambers may also be constructed which only have a movable wall on one side. The pressure which is applied to the movable walls may advantageously be produced by means of a gas or a liquid under pressure.

A filter press constructed in accordance with the present invention will now be described in greater detail by way of example with reference to the accompanying drawings, in which.

Figure 1:
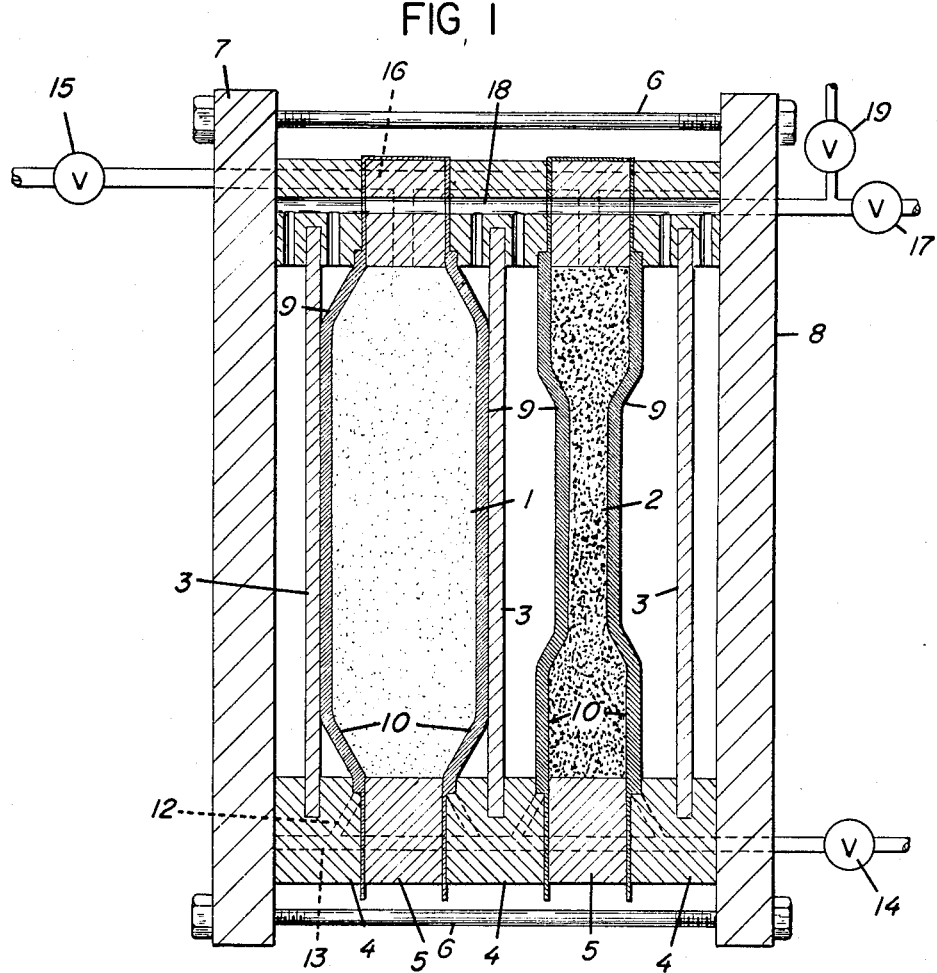
FIG. 1 is a cross-sectional view through the filter press.

Referring to FIG. 1 of the accompanying drawings, the filter press is provided with two filter chambers 1 and 2, the filter chamber 1 being shown in the condition in which it would be found after the filtering and/or washing process, and the filter chamber 2 being shown in the condition in which it would be found after the squeezing process. Naturally, all the filter chambers of a filter press are in the same condition at the same time, that is, filtering or squeezing is carried on in all the chambers simultaneously. The chambers 1 and 2 are only shown in different conditions for the sake of clarity. Plates 3 are supported in a vertical position by frame-like beams 4, adjacent beams being separated by a spacing frame 5. Therefore, even when using thin plates, a sufficiently large gap is provided between two adjacent frames 5. The whole system is pressed together by means of screw-threaded rods 6 and two end plates 7 and 8. Between frames 5 and beams 4 are clamped movable walls 9, which carry the filter medium on the side facing away from the plates 3. Each movable wall 9 together with its filter medium is clamped at its upper and lower edges between a frame 5 and a beam 4.

Figure 2:
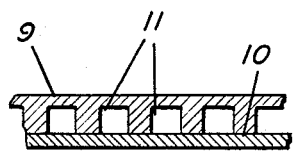
FIG. 2 is a sectional view through the movable wall carrying the filter medium, the section being taken in a horizontal plane.
Figure 3:
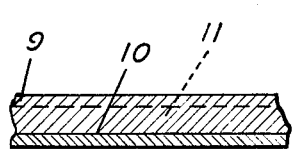
FIG. 3 is a vertical cross-section through the flexible wall shown in FIG. 2.

Referring to FIGS. 2 and 3 of the accompanying drawings, the movable walls 9 are constructed in the form of flexible membranes, prefrerably rubber membranes. On the side carrying the filter medium 10, they are provided with vertical grooves 11, through which the filtrate, having passed through the filter medium 10, runs downwards and passes through conduits 12 into a main conduit 13, leaving the filter press via a tap 14.

If both sides of a filter chamber are bordered by flexible membranes, as shown in FIG. 1, the two membranes can be provided with a single flexible sheet of filter medium, which is taken in a U-shape round one side of the frame 5.

In operation, the suspension which is to be filtered enters the filter chambers 1 and 2 through a connecting valve 15 and a conduit 16. As the filtrate leaves the filter press through the filter medium 10, grooves 11 and conduits 12 and 13, the filter chambers 1 and 2 gradually fill up with solid matter. Filter chamber 1 is in the condition reached when the filtration or the washing out has been completed. Because of the excess pressure present in the chamber during the filtering process, the movable walls 9 are pushed against the plates 3. In order to squeeze the filter cake, the valve 15 is closed and a valve 17 opened. Compressed air is then fed through a compressed air pipeline, not shown, via the valve 17 and a conduit 18 into the spaces between the plates 3 and the adjacent movable walls 9. The pressure of the air forces the two movable walls of a filter chamber towards each other. The filter chamber 2 is shown in the condition produced by this operation. By this means a pressure is exerted on the filter cake whereby moisture is removed from the solid matter as filtrate. When the squeezing operation has been completed, the pressure may be released by opening a venting valve 19.

The fixed plates between the individual chambers are not absolutely necessary, but they are of advantage for even filling of the chambers with solids. The construction described above illustrates the possibility of converting existing filter presses into filter presses according to the invention by means of small constructional modifications.

Surprisingly good results are obtained with a filter press according to the invention as described hereinbefore. Thus, a Pyrazolon with 5% solids content was filtered. The dry content of the filter cake was determined as 36%, whereas with a normal filter press, after blowing through with compressed air for a long period, a dry content of only 22% was obtained.

What is claimed is:

A filter press having a plurality of filter chambers each being bounded on each of two opposite sides by a flexible membrane capable of being bent in order to increase or decrease the volume of the filter chamber, each membrane having a layer of filter medium on the chamber side in contact with ridges between a plurality of grooves formed in its inner surface for leading away downwardly the filtrate which, in operation, passes through the filter medium; said filter press comprising a fixed rigid plate directly opposite the outer surface of each membrane, each fixed plate being mounted in a mounting frame; the membranes between which a filter chamber is formed being separated by means of a spacing frame; the mounting frames and the spacing frames being provided with means for withdrawing the filtrate from the filter chamber communicating with the said grooves of the membranes; each membrane, the fixed rigid plate directly opposite thereto, and the part of the mounting frame between said membrane and said fixed rigid plate forming the walls of a pressure chamber into which a fluid under pressure can be introduced.

References Cited by the Examiner

UNITED STATES PATENTS

| | | | |
|---|---|---|---|
| 1,308,943 | 7/1919 | French | 210—227 X |
| 1,330,332 | 2/1920 | Miller | 210—224 |
| 2,849,121 | 8/1958 | Burwell | 210—226 |
| 3,011,642 | 12/1961 | Blackburn | 210—225 X |
| 3,017,996 | 1/1962 | Riley | 210—351 X |
| 3,098,429 | 7/1963 | Hagglunc | 210—226 X |

FOREIGN PATENTS 1,149,495    7/1957    France.

REUBEN FRIEDMAN, *Primary Examiner.*

SAMIH ZAHARNA, *Examiner.*